United States Patent
Puddu et al.

(10) Patent No.: US 12,333,377 B2
(45) Date of Patent: Jun. 17, 2025

(54) TACTILE TRIGGER FEEDBACK ADVISOR TO BARCODE READERS

(71) Applicant: Datalogic IP Tech S.r.l., Lippo di Calderara di Reno (IT)

(72) Inventors: Luca Puddu, Bologna (IT); Nicola Bruni, Bologna (IT); Gianbattista Gualeni, Bologna (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 0 days.

(21) Appl. No.: 18/420,474

(22) Filed: Jan. 23, 2024

(65) Prior Publication Data

US 2024/0249093 A1    Jul. 25, 2024

Related U.S. Application Data

(60) Provisional application No. 63/481,153, filed on Jan. 23, 2023.

(51) Int. Cl.
*G06K 7/14* (2006.01)
*G08B 6/00* (2006.01)

(52) U.S. Cl.
CPC ............. *G06K 7/1413* (2013.01); *G08B 6/00* (2013.01)

(58) Field of Classification Search
CPC ..... G06K 7/1413; G06K 7/10881; G08B 6/00
See application file for complete search history.

(56) References Cited

U.S. PATENT DOCUMENTS 10,943,150 B2    3/2021  Stefanini et al.
2006/0208086 A1*  9/2006  Rudeen ................ G06K 7/0004
                                                        235/472.01

* cited by examiner

*Primary Examiner* — Jamara A Franklin
(74) *Attorney, Agent, or Firm* — Stoel Rives LLP

(57) ABSTRACT

The disclosure a barcode reader having a feedback device for providing tactile feedback to the user through the trigger button. The feedback device may be disposed within the housing and in cooperation with the trigger button. The feedback device may be configured to provide tactile feedback related to the barcode read to the user through the trigger button via a resistance impressed upon to the trigger button in a first instance, and a release of the resistance to the trigger button in a second instance.

20 Claims, 3 Drawing Sheets

TACTILE TRIGGER FEEDBACK ADVISOR TO BARCODE READERS

RELATED APPLICATIONS

This application claims the benefit of U.S. Provisional Application No. 63/481,153, filed Jan. 23, 2023, and entitled "Tactile Trigger Feedback Advisor to Barcode Readers," the disclosure of which is incorporated by reference herein in its entirety.

TECHNICAL FIELD

The present disclosure relates generally to scanners or code readers, and more particularly, to scanners that provide tactile feedback to a user for communicating a scanning result.

BACKGROUND

In data readers (e.g., barcode scanners), visual feedback (e.g., a green spot) has been provided as a convenient way to inform the user of a scanning result (e.g., a good read or a bad read). Audible feedback (e.g., a beep) has also been provided as another method of feedback. The inventors have appreciated that situations exist where visual feedback and audible feedback may not be sufficient. For example, certain readers may operate with a large operating range (e.g., over 15 meters) and/or in a noisy environment making such feedback difficult. Current vibration actuators tend to be expensive and fragile, which itself can compromise the operational life of the scanner. Conventional solutions tend to add one or more dampers within the scanner, which can reduce the efficiency of the vibration.

BRIEF SUMMARY

A barcode reader may comprise a housing and a trigger button disposed within the housing. The trigger is configured to initiate a barcode read in response to being pressed by a user. The reader may further include a feedback device disposed within the housing and in cooperation with the trigger button. The feedback device may be configured to provide tactile feedback related to the barcode read to the user through the trigger button via a resistance impressed upon to the trigger button in a first instance, and a release of the resistance to the trigger button in a second instance.

A method of providing tactile feedback to a user of a barcode reader may comprise initiating a barcode read in response to a trigger button of a barcode reader being pressed by a user, and providing, via a feedback device operable coupled with the trigger button, tactile feedback related to the barcode read to the user through the trigger button via a resistance impressed upon to the trigger button in a first instance, and a release of the resistance to the trigger button in a second instance.

DETAILED DESCRIPTION

Figure 1:
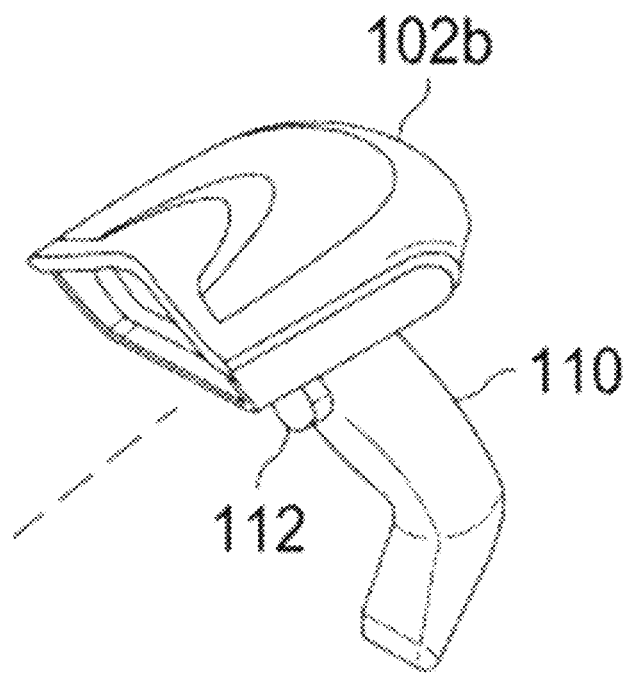
FIG. 1 is an example barcode reader according to embodiments of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

There are a lot of environments where handheld scanners are used where audio and/or visual feedback is not enough to signal a good or bad read due to local noise or for long distance. For example, a large retail store may have background noise that is too loud for audible feedback, and the long distance of parcel to read can be difficult to see visual feedback. Embodiments of the disclosure including devices and methods for providing feedback to an operator of a scanner (e.g., barcode scanner). Such a scanner may include handheld scanners having a variety of different housing arrangements, such as a gun-style housing with a handle, trigger, and scanning head. Examples of such arrangements include scanners that are part of the PowerScan, QuickScan, and Gryphon product lines available from Datalogic of Bologna, Italy. Such scanners may be used in industrial environments, retail environments, medical environments, office environments, etc. to scan indicia (e.g., barcodes, watermarks, alphanumeric text, etc.) to identify items and/or records associated therewith. The tactile feedback may be provided due to trigger button resistance on the hand gripper of the handheld device.

FIG. 1 is an example barcode reader 102b that includes a handle 110 that a user may hold and trigger 112 for the user to engage according to embodiments of the disclosure. The user may cause the barcode reader 102b to scan or image the machine-readable indicia. The barcode reader 102 may have a variety of alternative configurations, as understood in the art. In addition to handheld configurations, other form factors are also contemplated that use trigger buttons including wearable barcode readers (e.g., hand scanners, wrist scanners, etc.) in which a user may press a button with a finger or thumb to initiate a code read. Such devices are also contemplated within embodiments of the disclosure. Embodiments of the disclosure includes a motor within the barcode reader 102b that creates a resistance when the trigger 112 is pressed. This resistance is impressed until the motor is in power and released when the motor power is less. In some embodiments, the motor may power up until the decode is not complete, and will be release in case of a positive barcode read.

Figure 2:
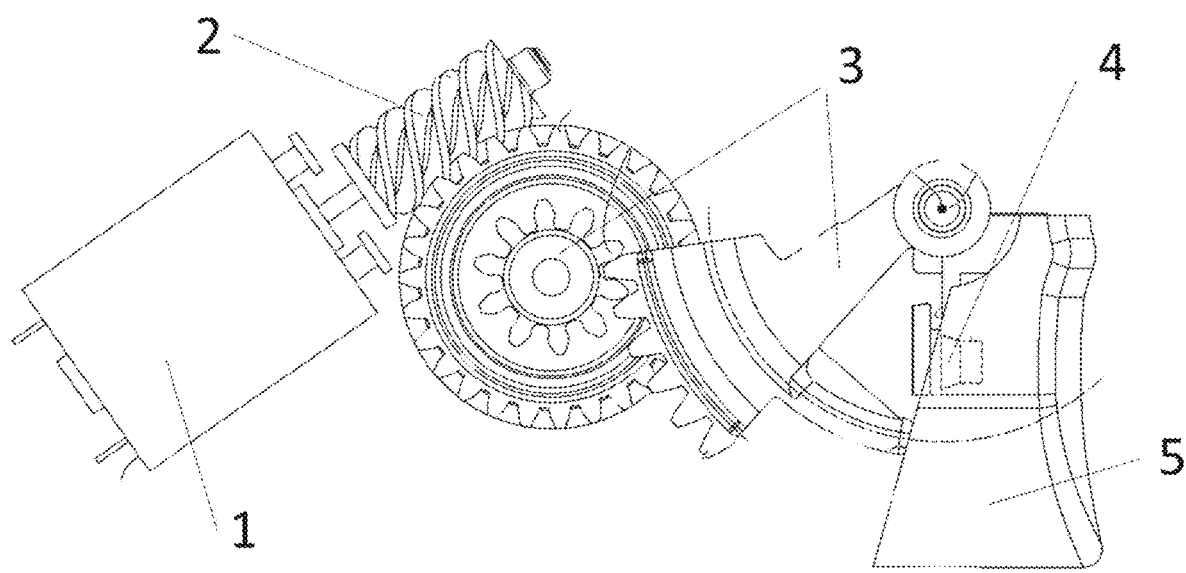
FIG. 2 is an example of a motor that is operable in cooperation with a mechanical trigger within a barcode reader according to an embodiment of the disclosure.

FIG. 2 is an example of a motor 1 that is operable in cooperation (e.g., via helical gears 2, transmitter gears 3, and electronic button 4) with a mechanical trigger button 5 within a barcode reader device according to an embodiment of the disclosure. Such a barcode reader device may be the barcode reader of FIG. 1 or other similarly configured devices that may use such mechanical trigger buttons to initiate a barcode read.

In operation, when the operator takes the barcode reader device and is ready to scan, the trigger button 5 is pressed by the operator. Pressing the trigger button 5 may actuate the electronic button 4 connected to the trigger button 5, which starts the acquisition of the image. At the same time, electrical power is provided to the motor 1, which actuates the helical gear 2 that transmits at the gears 3 an opposite force on the trigger button 5. This force may be calibrated to the resistance of the mechanical part, which creates an opposition at the pressing of the trigger button 5 and provides a feeling to the user that the trigger button 5 is hard to be pressed. At this point, there may be different results and feedback:

Situation 1: If the reading is completed with success (i.e., a "good read"), the electric power to the motor 1 will be dismissed, resulting in the trigger being softer to press.

Situation 2: If the reading is not successful (i.e., a "bad read"), the electric power to the motor 1 will be maintained to the end of the button stroke, resulting in the trigger being difficult to press.

This feedback provides to the operator information regarding the scanning results through the feeling of the button trigger via trigger button resistance, which may substitute for audible and/or visual feedback that may otherwise be provided. In some embodiments, the tactile feedback may be provided in addition to any audible and/or visual feedback provided by the barcode reader.

In some embodiments, the motor may include a stepper motor that may have a structure that enables modulating different levels of force or click to inform the customer on the type of code read. This may be beneficial during verify and read processes where a particular code is associated with a certain component or process. For example, at a logistic center (e.g., fulfillment center) there may be a need to verify if a customer order is filled with correct objects. The type of barcode read is indicative of whether a scanned item is correct for a given order in a logistic center, and the tactile feedback may be indicative of the scanned item being the correct item.

In some embodiments, the operation of the motor may be achieved in implementation beyond just mechanical. As such, electro-mechanical, electrical (e.g., piezoelectrical), MEMS, electromagnetic, and other similar devices and implementations are also contemplated as embodiments of the disclosure, which may provide additional durability or other benefits.

Figure 3:
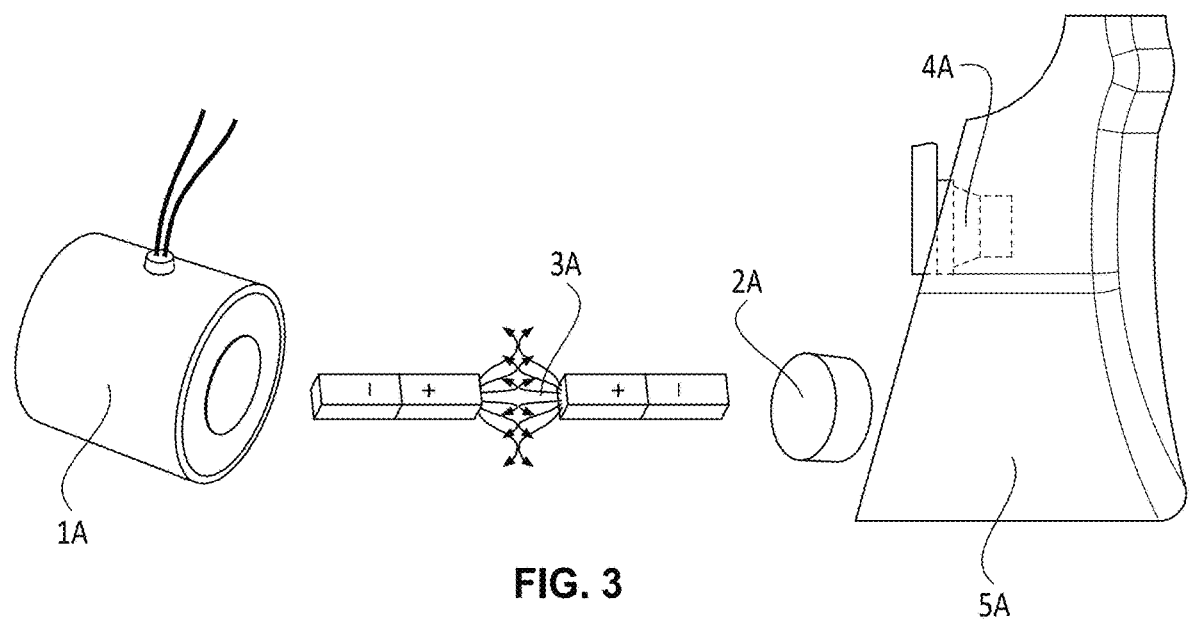
FIG. 3 is an example of another embodiment

FIG. 3 is another embodiment of a triggering system for creating a tactile response on the trigger button of a barcode reader. In this example, the tactile response may be created via an electromagnetism effect and magnets. Providing electric energy on a metal part may create a temporary magnet that can be oriented in front of permanent magnet with the same polarization. This method could be used to create a controllable opposition like a motor, but with fewer mechanical components.

An electromagnet 1A that is operable in cooperation (e.g., via permanent magnet 2A and electronic button 4A) with a mechanical trigger button 5A within a barcode reader device. In operation, when the operator positions the barcode reader device on the surface and is ready to scan, the user may press the trigger button 5A actuating on the electronic button 4A connected to the mechanical trigger 5A, that action start the acquisition and at the same time electric power is provided to the electromagnet 1A. The permanent magnet 2A creates a repulsion effect 3A cause from the same polarization between the magnet 2A and electromagnet 1A opportunely mounted. This repulsion force is applied on the trigger button 5A to generate the tactile effect.

Figure 4A:
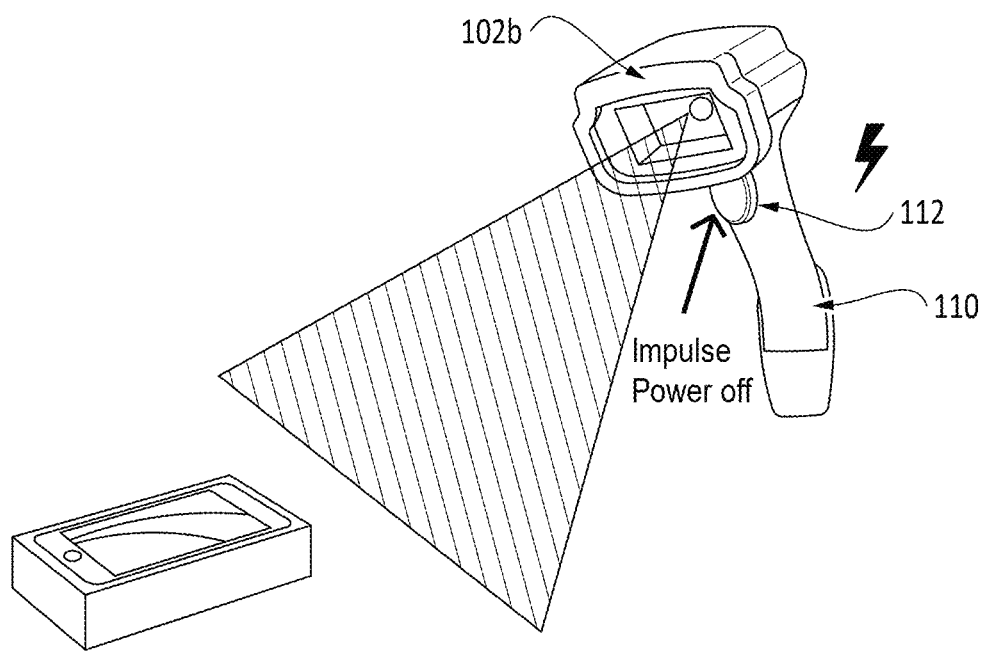
FIGS. 4A and 4B demonstrate different power schemes for powering the motor.
Figure 4B:
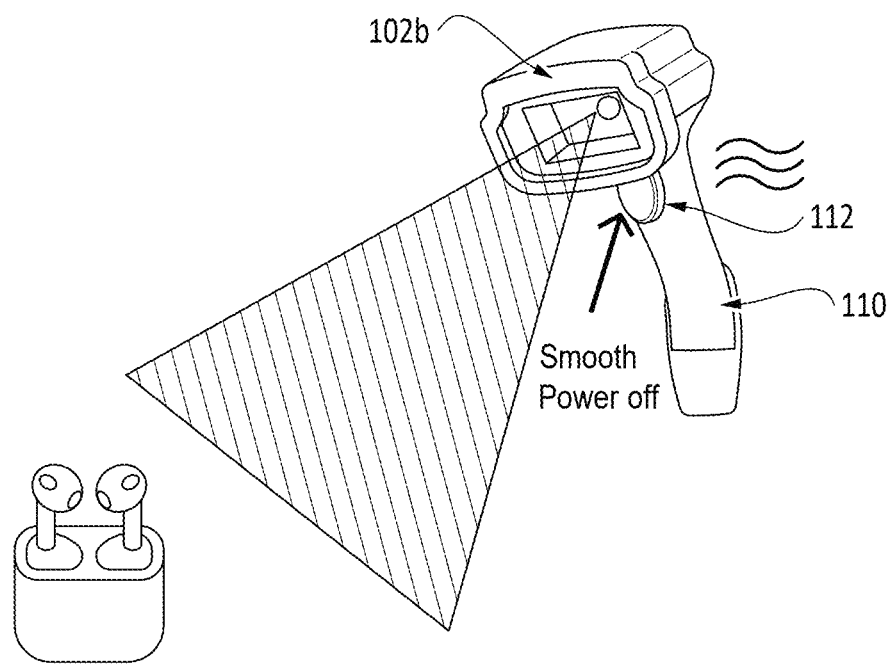

FIGS. 4A and 4B demonstrate different power schemes for powering the motor (e.g., impulse power off vs. smooth power off) for distinguishing between different product types or situations. For example, the tactile feedback may be indicative of different type of item or product based on release of the resistance to the trigger button 112. For example, the release of the resistance to the trigger button 112 may be one of a smooth release for a first product type or a pulsed release for a second product type. Different patterns of pulsed releases may further distinguish between additional product types. As described above, a stepper motor or other methods (e.g., electromagnet) may be utilized to create such distinguishing tactile responses.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A barcode reader, comprising:
   a housing;
   a trigger button disposed within the housing, wherein the trigger button is configured to initiate a barcode read in response to being pressed by a user; and
   a feedback device disposed within the housing and in cooperation with the trigger button, the feedback device configured to provide tactile feedback related to the barcode read to the user through the trigger button via a resistance impressed upon to the trigger button in a first instance, and a release of the resistance to the trigger button in a second instance, wherein the feedback device includes an electrical motor mechanically coupled to cooperate with the trigger button via actuation of a helical gear that transmits at gears an opposite force on the trigger button.

2. The barcode reader of claim 1, wherein the tactile feedback is indicative of a good read in the second instance when the resistance to the trigger button is released.

3. The barcode reader of claim 1, wherein the tactile feedback is indicative of a bad read when the release of the resistance does not occur in the second instance.

4. The barcode reader of claim 1, wherein the tactile feedback is indicative of a different type of item or product based on the release of the resistance to the trigger button.

5. The barcode reader of claim 1, wherein the release of the resistance to the trigger button is one of a smooth release for a first product type or a pulsed release for a second product type.

6. The barcode reader of claim 1, wherein the feedback device is configured to:
   release the opposite force on the trigger button responsive to a good read resulting in the trigger button being easier to be pressed; and
   maintain the opposite force to an end of the press by the user responsive to a bad read resulting in the trigger button being more difficult to be pressed.

7. The barcode reader of claim 1, wherein the housing is a handheld device with a scan head attached to a handle including the trigger button.

8. The barcode reader of claim 1, wherein the housing is a wearable device.

9. A barcode reader comprising:
   a housing;
   a trigger button disposed within the housing, wherein the trigger button is configured to initiate a barcode read in response to being pressed by a user; and
   a feedback device disposed within the housing and in cooperation with the trigger button, the feedback device configured to provide tactile feedback related to the barcode read to the user through the trigger button via a resistance impressed upon to the trigger button in a first instance, and a release of the resistance to the trigger button in a second instance, wherein the feedback device includes a stepper motor that is configured to enable modulating different levels of force.

10. The barcode reader of claim 9, wherein the tactile feedback is indicative of a different type of code read via a different level of force provided thereby.

11. A method of providing tactile feedback to a user of a barcode reader, the method comprising:
   initiating a barcode read in response to a trigger button of a barcode reader being pressed by a user; and
   providing, via a feedback device operably coupled with the trigger button, tactile feedback related to the barcode read to the user through the trigger button via a resistance impressed upon to the trigger button in a first instance, and a release of the resistance to the trigger button in a second instance, wherein providing the resistance includes providing power to a motor that generates an opposing force on the trigger button, and releasing resistance includes decreasing power to the motor.

12. The method of claim 11, wherein providing power or decreasing power is performed according to a predefined pattern indicative of a type of barcode read for the tactile feedback.

13. The method of claim 12, wherein the type of barcode read is indicative of whether a scanned item is correct for a given order in a fulfillment center.

14. The method of claim 12, wherein the tactile feedback is indicative of one of a good read or a bad read.

15. The method of claim 11, wherein the motor is a stepper motor for modulating different levels of force applied to the trigger button.

16. The method of claim 15, wherein the different levels of force are indicative of a particular type of code.

17. The method of claim 15, wherein the different levels of force are indicative of a particular code being associated with a certain component or process.

18. A method of providing tactile feedback to a user of a barcode reader, the method comprising:

initiating a barcode read in response to a trigger button of a barcode reader being pressed by a user; and providing, via a feedback device including an electromagnet in operable cooperation with the trigger button, tactile feedback related to the barcode read to the user through the trigger button via a resistance impressed upon to the trigger button in a first instance, and a release of the resistance to the trigger button in a second instance, wherein providing the resistance includes providing power to the electromagnet to create a repulsion effect that is applied to the trigger button, and releasing the resistance includes decreasing power to the electromagnet to decrease the repulsion effect to create the tactile feedback.

19. The method of claim 18, further comprising actuating an electronic button connected to the mechanical button to start providing power to the electromagnet at the same time as acquisition of the barcode during the barcode read.

20. The method of claim 18, wherein the repulsion effect is caused by a same polarization being created between the electromagnet and a permanent magnet.

* * * * *